United States Patent
Auer

(10) Patent No.: US 10,568,303 B2
(45) Date of Patent: Feb. 25, 2020

(54) METHOD FOR LOCATING ANIMALS

(71) Applicant: SMARTBOW GMBH, Weibern (AT)

(72) Inventor: Wolfgang Auer, Weibern (AT)

(73) Assignee: Smartbow GmbH, Weibern (AT)

(*) Notice: Subject to any disclaimer, the term of this patent is extended or adjusted under 35 U.S.C. 154(b) by 179 days.

(21) Appl. No.: 15/117,541

(22) PCT Filed: Feb. 12, 2015

(86) PCT No.: PCT/AT2015/000022
§ 371 (c)(1),
(2) Date: Aug. 9, 2016

(87) PCT Pub. No.: WO2015/120495
PCT Pub. Date: Aug. 20, 2015

(65) Prior Publication Data
US 2016/0345543 A1    Dec. 1, 2016

(30) Foreign Application Priority Data

Feb. 14, 2014  (AT) .................................. A 107/2014

(51) Int. Cl.
*A01K 29/00*     (2006.01)
*A01K 11/00*     (2006.01)
(Continued)

(52) U.S. Cl.
CPC .......... *A01K 29/005* (2013.01); *A01K 11/004* (2013.01); *A01K 11/008* (2013.01); *G01S 5/04* (2013.01); *G01S 5/12* (2013.01)

(58) Field of Classification Search
CPC .. A01K 11/004; A01K 29/005; A01K 27/001; G01S 5/04; G01S 5/12;
(Continued)

(56) References Cited

U.S. PATENT DOCUMENTS 3,999,611 A   12/1976   Bucalo
6,122,960 A    9/2000   Hutchings et al.
(Continued)

FOREIGN PATENT DOCUMENTS

AT        506628 A1     10/2009
DE      10045469 C2     12/2002
(Continued)

OTHER PUBLICATIONS

International Search Report regarding Application No. PCT/AT2015/000022, dated Feb. 12, 2015.
(Continued)

*Primary Examiner* — Mirza F Alam
(74) *Attorney, Agent, or Firm* — Harness, Dickey & Pierce, P.L.C.

(57) ABSTRACT

The invention relates to a method for automatically locating an animal by means of radio waves and a plurality of nodes (1, 2, 3), wherein the animal is located on a ground (5) and is equipped with a node (1) of the radio locating system to be located and with one or more acceleration sensors. By evaluating the measurement results of the acceleration sensors, a conclusion is drawn about which activity the animal is presently performing and at which height above the ground (5) the node (1) is located. The calculation of the position of the node (1) to be located from the measurement results of the radio locating system is influenced by the assumption of said height as a constraint.

2 Claims, 2 Drawing Sheets

Figure 1:
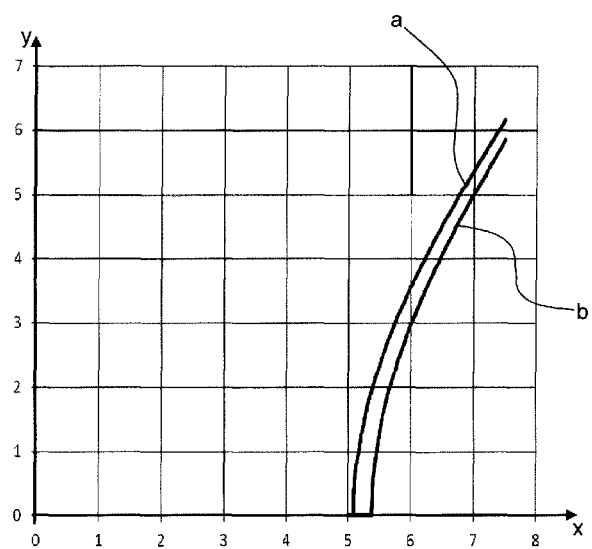

(51) Int. Cl.
*G01S 5/04* (2006.01)
*G01S 5/12* (2006.01)

(58) Field of Classification Search
CPC ...... A61D 17/002; G06Q 10/08; G06Q 20/10; A63B 2220/12; A63B 2220/20; A61B 5/1118
See application file for complete search history.

(56) References Cited

U.S. PATENT DOCUMENTS

| | | | |
|---|---|---|---|
| 6,487,992 B1* | 12/2002 | Hollis | A01K 15/021 |
| | | | 119/712 |
| 7,616,124 B2 | 11/2009 | Paessel et al. | |
| 2005/0145187 A1* | 7/2005 | Gray | A01K 11/008 |
| | | | 119/174 |
| 2008/0190202 A1* | 8/2008 | Kulach | A63B 24/0062 |
| | | | 73/514.01 |
| 2009/0009388 A1* | 1/2009 | Wangrud | A01K 11/008 |
| | | | 342/357.55 |
| 2009/0211538 A1* | 8/2009 | Corke | A01K 29/005 |
| | | | 119/720 |
| 2010/0238022 A1* | 9/2010 | Au | A01K 15/023 |
| | | | 340/539.13 |
| 2011/0298619 A1* | 12/2011 | O'Hare | A01K 11/008 |
| | | | 340/573.1 |
| 2013/0035110 A1* | 2/2013 | Sridhara | H04W 4/029 |
| | | | 455/456.1 |

FOREIGN PATENT DOCUMENTS

| | | |
|---|---|---|
| EP | 549081 A1 | 6/1993 |
| EP | 1494397 A2 | 1/2005 |
| GB | 2234070 A | 1/1991 |
| GB | 2278198 A | 11/1994 |
| WO | WO-9941723 A1 | 8/1999 |
| WO | WO-2002091001 A1 | 11/2002 |
| WO | WO-2003055388 A2 | 7/2003 |
| WO | WO-2006077589 A2 | 7/2006 |
| WO | WO-2008113556 A1 | 9/2008 |
| WO | WO-2009135493 A1 | 11/2009 |
| WO | WO-2010066429 A1 | 6/2010 |
| WO | WO-2010108496 A1 | 9/2010 |
| WO | WO-2010109313 A1 | 9/2010 |
| WO | WO-2011153571 A2 | 12/2011 |
| WO | WO-2012079107 A2 | 6/2012 |

OTHER PUBLICATIONS

Written Opinion (in German) regarding Application No. PCT/AT2015/000022, dated Feb. 12, 2015.

* cited by examiner

METHOD FOR LOCATING ANIMALS

CROSS REFERENCE TO RELATED APPLICATIONS

This application is a U.S. National Phase under 35 U.S.C. 371 of International Application No. PCT/AT2015/000022, filed Feb. 12, 2015, and published as WO 2015/120495 on Aug. 20, 2015. This application claims the benefit of and priority to Austrian Patent Application No. A 107/2014, filed Feb. 14, 2014. The entire disclosures of the above applications are incorporated herein by reference.

The invention relates to a method for locating animals with the aid of radio waves.

Known systems for locating objects, for example animals, with the aid of radio waves have a plurality of radio transmitters and/or radio receivers at known positions and a respective radio transmitter and/or radio receiver on each object to be located.

Furthermore, the transmitters and receivers used for locating by means of radio waves are simply referred to as "nodes". According to a frequently used method, in order to determine the position of the node fitted to the animal to be located, radio signals are used in the first step to measure the length by which the distances between the individual nodes of known position and the node to be located differ from one another. For this purpose, a signal is simultaneously transmitted to all other nodes from the node to be located, for example. The receiving nodes measure the time at which this signal arrives at them. The differences between the individual measured times, each multiplied by the speed of light (signal propagation speed in the relevant medium), result in the differences in the distance between the individual nodes and the transmitting node. For the further calculation, it is assumed in the first step that the node to be located is on a hyperboloid, the axis of which runs through two nodes of known position as focal points, the measured difference in the distance between these nodes and the node to be located being equal to that length by which—by definition—the distances between the two focal points and each point on the hyperboloid differ. The possible position of the device to be located is restricted to two points as a result of at least three such hyperboloids intersecting. The further restriction to one point can be effected with the aid of a fourth hyperboloid (with the result that at least four nodes of known position are therefore required) or by virtue of one point being able to be excluded anyway on the basis of known geometrical circumstances, for example because said point is outside the shed inside which animals can move. (In this text, "hyperboloid" is used to mean a rotationally symmetrical shell-shaped area which can be considered to have been produced by rotation of a hyperbola around its main axis.)

If, in a modification of the method described, radio waves are used in the first step to directly infer the distances between the node on the animal to be located and the individual nodes of known position, spherical shells can be assumed in the second step instead of the hyperboloid shells.

In a simplifying further modification of the method described, radio waves are used to measure only a single distance, namely the distance between a single node of known position and the node to be located. The result is then precisely said distance between the two nodes or, if it is known that the node to be located may be only on a known line anyway on account of structural circumstances, the position which results from the line of intersection of the known line with that sphere whose radius is equal to the measured distance between the two nodes and whose center point is on the node of known position.

The documents AT 506628 A1, U.S. Pat. No. 6,122,960 A, DE 100 45 469 C2, WO9941723 A1, WO2011153571 A2 and WO2012079107 A2, for example, deal with the radio localization of animals according to the principles explained.

On account of considerable measurement errors and measurement inaccuracies which are often unavoidable in practice—for example on account of reflections of radio waves—it is necessary to introduce further logical assumptions and to carry out corresponding evaluations in order to be able to obtain a reasonably reliable location result. In addition to the already mentioned practice of excluding results which are impossible on account of geometrical circumstances, stochastic methods are used, in particular, to also restrict the ambiguity of the respective current result(s) on the basis of the results from preceding measurements and to find that measurement result which reflects reality with the lowest probability of errors. A proven stochastic model is the hidden Markov model in this context and, in particular, the Viterbi algorithm which can be used to find the currently most probable sequence of states in each case from a multiplicity of possible sequences of states in a relatively efficient manner. For example, EP 1 494 397 A2 describes such a method, in particular for use for radio localization in buildings, which is particularly difficult on account of repeatedly occurring signal reflections.

The documents EP 549081 A1, GB 2234070 A, GB 2278198 A, U.S. Pat. Nos. 3,999,611 A, 6,122,960 A, 7,616,124 B2, WO 2002091001 A1, WO 2003055388 A2, WO 2006077589 A2, WO 2010108496 A1 and WO 2010109313 A1, for example, propose and explain the practice of fitting acceleration sensors (inter alia) to live animals and using the measurement results from the acceleration sensors to infer the behavior of the animals which results in the respective accelerations. For this purpose, the measurement results are usually transmitted to a data processing system via a radio connection and are checked by said data processing system for matches with temporal profiles of acceleration data stored as patterns.

In this case, the temporal profiles stored as patterns are characteristic of particular activities of the animal, for example walking, eating, ruminating, sleeping, possibly walking with a limp, mounting other animals. In order to find the characteristic patterns, acceleration data and, in parallel therewith, the activities of animals determined on the basis of immediate observation were recorded in earlier work and correlations between acceleration patterns and activities were filtered from the recorded data.

It is also possible to already evaluate acceleration measurement data entirely or partially in a data processing system which is on that device which is on the animal and comprises the acceleration sensor(s).

WO9941723 A1 deals with a device which is carried by a person or an animal, can transmit and receive radio waves and the position of which can be determined by a satellite navigation system. It is also mentioned that, in addition to various other sensors which can measure a biological state, for example, the device can also have an acceleration sensor.

WO2011153571 A2 and WO2012079107 A2 deal with wireless ear tags for animals, an ear tag both enabling radio location and being able to contain an acceleration sensor which can be used to automatically identify activities of the animal by means of pattern evaluation.

U.S. Pat. No. 6,122,960 A deals predominantly with the measurement and recording of movements and distances covered by persons or animals by measuring accelerations and evaluating the measurements. It is additionally proposed to determine an "absolute position" by means of radio navigation.

On the basis of this prior art, the object of the invention is to provide a method for locating animals with the aid of radio waves, which method can be used and takes place automatically in exercise pens and enclosures for animals and provides more accurate and more reliable results in comparison with such known methods in terms of the investment costs required for this purpose.

In order to achieve the object, it is proposed to combine radio location and analysis of the data from at least one acceleration sensor in the following novel manner:

The data from the acceleration sensor are used to infer whether the relevant animal is in an upright (standing, walking or running) position or in a lying position. Depending on this decision, it is concluded how high a node, which is arranged on the animal and is used for radio location, is above the ground. The information relating to the height position of the node to be located can be included, as a boundary condition, in that calculation which is to be carried out during radio location and according to which the position of the node to be located is calculated from the results of one or more distance measurements or distance difference measurements between the node fitted to the animal and one or more nodes of known position.

Assuming the boundary condition that the node to be located is in a particular area already results in the calculation, which is required in radio location to find the coordinates of the location at which this node is situated, being highly simplified in comparison with a situation without such a boundary condition. A node of known position is less sufficient.

By virtue of the fact that, according to the results of the evaluation of the acceleration measurements, it is still possible to clearly stipulate in which of two different clearly defined areas the node to be located must lie, it is naturally possible to achieve considerably better accuracy than if, instead of this, only a mean "average area" were used and in this case it would not be known whether the node to be located is actually somewhat above or below this. Very important advantages of the method according to the invention result when shading objects such as walls or other animals are in the region in which the node to be located may be. In the method according to the invention, through the knowledge of the height at which the node to be located is situated, it is then possible to very correctly selectively state whether or not this node is shaded from direct visual contact with particular nodes of known position. It is therefore subsequently possible to very correctly selectively state whether or not the results from the respective node of known position can be concomitantly included in a calculation.

The invention is illustrated using outline sketches:

FIG. 1: shows, in a view from above, lines of intersection of a hyperboloid, the axis of which runs parallel to the X axis, with two planes which are parallel to the xy plane at different heights.

Figure 2:
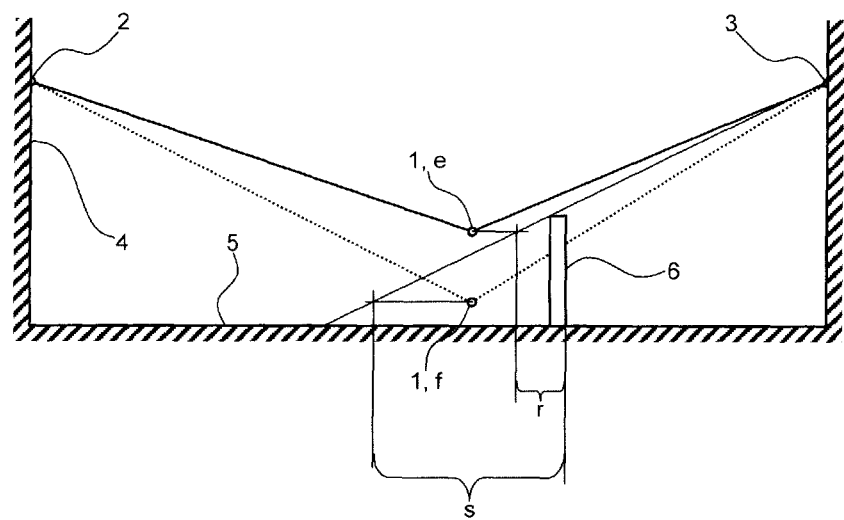

FIG. 2: shows a side view of geometrical relationships in an exemplary space in which the invention is used.

The curves a, b from FIG. 1 are each a section of a line of intersection of a single hyperboloid with two different planes parallel to the xy plane. Assuming that the unit of length is a meter, the focal points of the hyperboloid are 15 meters away from one another, on a straight line parallel to the x axis, with the x coordinates of −7.5 and +7.5, and the difference in the distances of the two focal points with respect to each point of the hyperboloid is 10 meters. The sectional plane which leads to the curve a is one meter below the connecting line between the focal points. The sectional plane which leads to the curve b is 2.2 meters below the connecting line between the focal points.

The curves a, b therefore reflect the ideal conditions if
a node of a radio location system is respectively fitted to walls which are 15 meters away from one another at a height of 2.5 meters in a shed, and
if there are cattle in the shed, in the case of which the node to be located is an ear tag and is at a height of 1.5 meters if a cow is standing or walking and is at a height of 0.3 meters if the cow has lain down or is eating from the ground, and
if the distance between the ear tag of a cow and the one node is 10 meters greater than the distance from the other node, and
if the radio location principle used is one in which the differences between the signal propagation times between the node to be located and the various nodes of known position are measured.

With respect to the xy coordinates, the normal distance between the two sectional curves a, b is only approximately ⅓ meter and is therefore not significant at first glance. However, it is seen that, in the normal to the connecting line between the focal points of the hyperboloid, that is to say in the normal to the connecting line between the two nodes of known position, the distance between the two curves a, b can be approximately two meters if the node to be located is in the vicinity of the connecting line between the nodes of known position.

The use according to the invention of one particular curve of two different curves a, b instead of a single "average curve" (which could be assumed to be in the middle between the curves a, b) therefore drastically improves the measurement accuracy with respect to the y coordinate, while the improvement in the measurement accuracy with respect to the x coordinate (which is parallel to the connecting line between the nodes of known position) is only minor.

The perhaps most important advantage of the method according to the invention is explained using FIG. 2.

Animals which have nodes 1 to be located, typically in the form of an ear tag, are in a compound, for example an exercise pen, which is defined by side walls 4 and the ground 5. Nodes 2, 3 of a radio location system are anchored at a known position on the side walls. An object 6 which shades some volume areas r, s above the ground 5 of the compound with respect to the node 3 is situated in the compound, with the result that there is no direct visual contact with the node 3 from these volume areas. The shading object may be, for example, a separating wall, a feeding device or else another animal, the position of which has been determined by means of radio location.

As is known per se, it is taken into account, when logically evaluating the results of the radio location which are ambiguous per se, whether or not the node 1 to be located can actually be situated at a location apparently resulting from the calculation. Furthermore, if the required basic information is available, calculation results, in which measurement results from the node 3 have been concomitantly included, are excluded as invalid if they state that the node 1 to be located is in a volume area s from which there is no direct visual contact at all with the node 3 of known position. This is because the measured signal propagation time on which the calculation is based then cannot reflect the distance between the nodes 1 and 3 on a direct elongated line.

By virtue of the fact that the height at which the node 1 to be located must be situated is already assumed, according to the invention, as a boundary condition for calculating the position, considerably different volume areas s, r, which are shaded from the node 3 by the object 6, result for the calculation depending on the situation (smaller or larger of the two possible heights).

If a calculation using the radio location results reveals that the node 1 to be located is in a volume area s, r shaded with respect to a node 3 and if measured values from the node 3 are concomitantly included in this calculation, the relevant calculation result can be classified as invalid, that is to say cannot be considered any further, for the further evaluation.

In the example illustrated in FIG. 2, the calculation result which concomitantly includes the node 3 can therefore be handled further as a possible result if it is known, on the basis of the evaluation of the results from the acceleration measurements, that the node 1 to be located must be at the higher position, thus resulting in the point e as its calculated whereabouts. In contrast, a calculation result which concomitantly includes the measurement result from the node 3 can be classified as certainly invalid with respect to the further evaluation if it is known, on the basis of the evaluation of the results from the acceleration measurements, that the node 1 to be located must be at the lower position, thus resulting in point f as its calculated whereabouts since the point f is in the volume area s shaded from the node 3 by the object 6.

The method according to the invention can be used for a wide variety of animals. In practice, uses on cattle and pigs are probably the most significant. For each type of animal and possibly also individually for each individual animal, it is necessary to check and stipulate for the calculations at which height above the ground the node arranged on the animal is most likely to be during which activities of the animal. If more than two different activities of the animal can be identified during the acceleration evaluation, more than two possible heights may also be defined under certain circumstances, in which case a different height is respectively assigned to a different activity (standing, "sitting", lying, lying with the head raised, lying with the head on the ground etc.). The one correct height in each case can then be selected from more than two possible heights as the boundary condition for calculating the position from the radio location.

Particularly simple calculations result if the ground 5 is a flat surface and if all nodes 2, 3 of known position are arranged at the same height above the ground 5.

The invention claimed is:

1. A method comprising:
measuring, using a sensor, an acceleration of an animal;
determining, using a data processing system, an activity of the animal using the measured acceleration;
determining, using the data processing system, a height of a first node associated with the animal based on the activity;
transmitting, using a radio location system, a signal;
determining, using the radio location system, a distance between the first node and a second node of known position based on the signal;
calculating, using the data processing system, a plurality of possible positions of the first node using the distance between the first node and the second node and the position of the second node;
determining, using the data processing system, whether the first node and the second node are in a direct line of sight with each other;
eliminating, using the data processing system, positions of the plurality of possible positions of the first node if the first node and the second node are not in direct line of sight with each other and the determined height is above a predetermined height;
selecting, using the data processing system, out of the remaining plurality of possible positions the actual matching position of the first node; and
locating the animal based on the position of the first node.

2. The method of claim 1, wherein the activity is one of standing, sitting, lying, lying with head raised and lying with head on the ground.

* * * * *